US010115305B2

(12) United States Patent
Mortazavi et al.

(10) Patent No.: US 10,115,305 B2
(45) Date of Patent: Oct. 30, 2018

(54) OPTIMIZING AUTONOMOUS CAR'S DRIVING TIME AND USER EXPERIENCE USING TRAFFIC SIGNAL INFORMATION

(71) Applicant: Nissan North America, Inc., Franklin, TN (US)

(72) Inventors: Ali Mortazavi, Walnut Creek, CA (US); Maarten Sierhuis, San Francisco, CA (US); Mauro Della Penna, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 111 days.

(21) Appl. No.: 15/282,664

(22) Filed: Sep. 30, 2016

(65) Prior Publication Data
US 2018/0096597 A1  Apr. 5, 2018

(51) Int. Cl.
*G08G 1/0967* (2006.01)
*G01C 21/34* (2006.01)
(Continued)

(52) U.S. Cl.
CPC ... *G08G 1/096725* (2013.01); *G01C 21/3415* (2013.01); *G01C 21/3492* (2013.01);
(Continued)

(58) Field of Classification Search
CPC ....... G08G 1/096725; G08G 1/096844; G01C 21/3415; G01C 21/3492; G05D 1/0088; G05D 1/0278; H04B 1/3822; H04W 4/023
(Continued)

(56) References Cited

U.S. PATENT DOCUMENTS 5,889,477 A    3/1999  Fastenrath
6,314,368 B1  11/2001  Gurmu et al.
(Continued)

FOREIGN PATENT DOCUMENTS

WO    2015129366 A1    9/2015

OTHER PUBLICATIONS

Koukoumidis et al., "SignalGuru: Leveraging Mobile Phones for Collaborative Traffic Signal Schedule Advisory", MobiSys '11, Jun. 28-Jul. 1, 2011; Proceedings of the 9th International Conference on Mobile Systems, Applications, and Services, pp. 127-140.
(Continued)

*Primary Examiner* — Muhammad Shafi
(74) *Attorney, Agent, or Firm* — Young Basile Hanlon & MacFarlane, P.C.

(57) ABSTRACT

Methods, apparatuses, and non-transitory computer readable storage media for optimizing driving time based on traffic signal states are described. The disclosed technology includes a vehicle that is able to determine, based on route data, a plurality of distances that correspond to paths between a vehicle location and a destination location for the vehicle. The route data can include a map of a predetermined area that includes the vehicle location and the destination location. The vehicle can receive traffic signal data that includes traffic signal states for a corresponding traffic signals on the paths. The vehicle can determine travel times corresponding to a predetermined portion of the paths based on the distances and the traffic signal states. The vehicle can determine an optimized path between the vehicle location and the destination location based on the path that is determined to have the shortest travel time.

21 Claims, 8 Drawing Sheets

(51) Int. Cl.
 *G05D 1/00*  (2006.01)
 *G05D 1/02*  (2006.01)
 *G08G 1/0968* (2006.01)
 *H04B 1/3822* (2015.01)
 *H04W 4/02*  (2018.01)
 *H04W 4/04*  (2009.01)
 *G08G 1/07*  (2006.01)

(52) U.S. Cl.
 CPC ......... *G05D 1/0088* (2013.01); *G05D 1/0212* (2013.01); *G05D 1/0278* (2013.01); *G08G 1/07* (2013.01); *G08G 1/096775* (2013.01); *G08G 1/096783* (2013.01); *G08G 1/096827* (2013.01); *G08G 1/096844* (2013.01); *H04B 1/3822* (2013.01); *H04W 4/023* (2013.01); *H04W 4/027* (2013.01); *H04W 4/046* (2013.01)

(58) Field of Classification Search
 USPC ............................................ 701/26; 710/26
 See application file for complete search history.

(56) References Cited

U.S. PATENT DOCUMENTS

| | | | |
|---|---|---|---|
| 6,502,033 B1 | 12/2002 | Phuyal | |
| 8,972,145 B2 | 3/2015 | Mahler et al. | |
| 2002/0026277 A1 | 2/2002 | Kerner et al. | |
| 2006/0009188 A1* | 1/2006 | Kubota | G08G 1/096725 455/344 |
| 2006/0038704 A1 | 2/2006 | Poltorak | |
| 2010/0114472 A1* | 5/2010 | Oumi | G01C 21/343 701/532 |
| 2011/0037618 A1 | 2/2011 | Ginsberg et al. | |
| 2011/0182475 A1 | 7/2011 | Fairfield et al. | |
| 2012/0139754 A1* | 6/2012 | Ginsberg | G08G 1/096775 340/905 |
| 2012/0274481 A1* | 11/2012 | Ginsberg | G08G 1/096775 340/905 |
| 2013/0096826 A1 | 4/2013 | Krzanowski et al. | |
| 2013/0166109 A1 | 6/2013 | Ginsberg | |
| 2016/0214607 A1 | 7/2016 | Dolgov et al. | |
| 2016/0231746 A1 | 8/2016 | Hazelton et al. | |
| 2016/0288791 A1 | 10/2016 | Park | |
| 2016/0349066 A1 | 12/2016 | Chung et al. | |
| 2017/0010613 A1 | 1/2017 | Fukumoto | |

OTHER PUBLICATIONS

Protschky, Valentin, et al.; "Adaptive Traffic Light Prediction Via Kalman Filtering", IEEE Intelligent Vehicles Symposium (IV), Jun. 8, 2014, Dearborn, Michigan, USA, 7 pp.

Seredynski, Marcin, et al.; "Comparison of Green Light Optimal Speed Advisory Approaches", Proceedings of the 16th International IEEE Annual Conference on Intelligent Transportation Systems (ITSC 2013), The Hague, The Netherlands, Oct. 6, 2013, 6 pp.

Bodenheimer, Robert, et al.; "Enabling GLOSA for Adaptive Traffic Lights", 2014 IEEE Vehicular Networking Conference (VNC), 8 pp.

Barthauer, Mirko, et al.; "Evaluation of a signal state prediction algorithm for car to infrastructure applications", www.sciencedirect.com; Transportation Research Procedia 3 (2014) pp. 982-991, 10 pp.

Koukoumidis, Emmanouil, et al.; "Leveraging Smartphone Cameras for Collaborative Road Advisories", IEEE Transactions on Mobile Computing, vol. 11, No. 5, May 2012, 17 pp.

Katsaros, Konstantinos, et al.; "Performance study of a Green Light Optimized Speed Advisory (GLOSA) Application Using an Integrated Cooperative ITS Simulation Platform", 2011 IEEE, pp. 918-923, 6 pp.

Van Katwijk, R.T.; "Multi-Agent Look-Ahead Traffic-Adaptive Control", TRAIL Thesis Series T2008/3, The Netherlands TRAIL Research School, ISBN 978-90-5584-098-4, 2008, 173 pp.

Protschky, Valentin, et al.; "Extensive Traffic Light Prediction Under Real-World Conditions", 2014 IEEE, 5 pp.

Buckholz, Traffic Signal Phasing, Mar. 2015, http://web.arch ive.org/web/20 1503210841 01/http://nacto.org/docs/usdg/traffic_signal_phasing_ buckholz. pd.

Wikipedia, Feature Scaling, Oct. 2014, http://web.archive.org/web/20141 012184320/http://!en.wikipedia.org/wiki/Feature_scalin.

Wikipedia, Machine Learning, Dec. 2014, https://web.arch ive.org/web/20 141208185048/https ://en.wikipedia.org/wiki/Mach ine_learning.

\* cited by examiner

OPTIMIZING AUTONOMOUS CAR'S DRIVING TIME AND USER EXPERIENCE USING TRAFFIC SIGNAL INFORMATION

TECHNICAL FIELD

This application relates to vehicle operation, including methods, apparatuses, and non-transitory computer readable media for optimizing an autonomous vehicle's driving time by using traffic signal information.

BACKGROUND

The safe and efficient movement of vehicles through a road system makes use of mechanisms, such as traffic lights, that regulate the flow of traffic. By periodically stopping the movement of traffic along one axis of an intersection, then alternating to stop the movement of traffic along the other axis, a traffic regulation mechanism such as a traffic signal attempts to balance traffic flows. In this way, vehicles from different directions are able to pass through intersections safely and without stopping the flow of traffic in one direction for prolonged time periods.

However, it is often the case that the flow of traffic is not evenly balanced in every direction, or that the flow of traffic is so light that the stoppage in traffic flow caused by traffic signals unnecessarily hinders the flow of traffic. As such, under certain circumstances, traffic flow may suffer due to excessive or overly rigid traffic regulation.

SUMMARY

Disclosed herein are aspects, features, elements, implementations, and implementations to optimize driving time and user experience using traffic signal information.

An aspect of the disclosed implementations is a method for optimizing driving time. The method for optimizing driving time includes determining, by a processor, based on route data, a plurality of distances corresponding to a plurality of paths between a vehicle location and a destination location, wherein the route data includes a map of a predetermined area including the vehicle location and the destination location. The method further includes, receiving, by the processor, traffic signal data including a plurality of traffic signal states for a plurality of traffic signals on the plurality of paths. The method includes, determining, by the processor, a plurality of travel times corresponding to a predetermined portion of the plurality of paths based on the plurality of distances and the plurality of traffic signal states. The method includes, determining, by the processor, an optimized path between the vehicle location and the destination location based on the path of the plurality of paths that corresponds to the lowest or shortest travel time of the plurality of travel times.

An aspect of the disclosed implementations includes a driving time optimization apparatus that comprises: a non-transitory memory; and a processor configured to execute instructions stored in the non-transitory memory to: determine, based on route data, a plurality of distances corresponding to a plurality of paths between a vehicle location and a destination location, wherein the route data includes a map of a predetermined area including the vehicle location and the destination location. The driving time optimization apparatus further executes instructions stored in the non-transitory memory to: receive traffic signal data including a plurality of traffic signal states for a plurality of traffic signals on the plurality of paths; determine a plurality of travel times corresponding to a predetermined portion of the plurality of paths based on the plurality of distances and the plurality of traffic signal states; and determine an optimized path between the vehicle location and the destination location based on the path of the plurality of paths that corresponds to the lowest or shortest travel time of the plurality of travel times.

An aspect of the disclosed implementations is A non-transitory computer-readable storage medium including program instructions executable by one or more processors that, when executed, cause the one or more processors to perform operations. The operations comprise determining, based on route data, a plurality of distances corresponding to a plurality of paths between a vehicle location and a destination location, wherein the route data includes a map of a predetermined area including the vehicle location and the destination location. The operations include receiving traffic signal data including a plurality of traffic signal states for a plurality of traffic signals on the plurality of paths. The operations further include determining a plurality of travel times corresponding to a predetermined portion of the plurality of paths based on the plurality of distances and the plurality of traffic signal states. The operations also include determining an optimized path between the vehicle location and the destination location based on the path of the plurality of paths that corresponds to the lowest or shortest travel time of the plurality of travel times.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
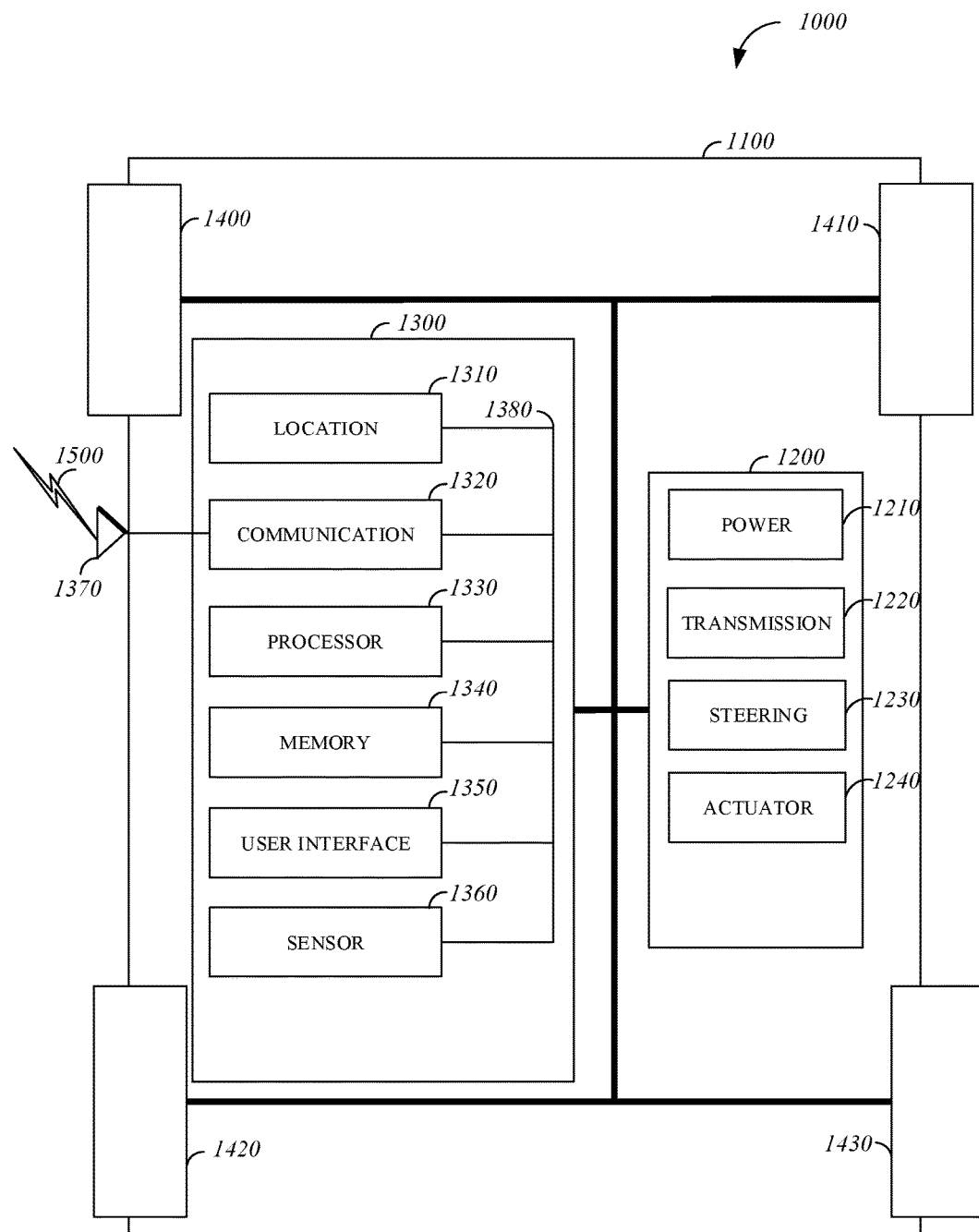
FIG. 1 is a diagram of an example of a portion of a vehicle in which the aspects, features and elements disclosed herein may be implemented.

A transportation network regulates the flow of vehicular and non-vehicular traffic by designating certain areas to vehicle traffic and further by regulating those areas through the use of traffic regulation mechanisms such as traffic signals. Traffic signals regulate the flow of traffic by alternatively stopping the flow of traffic in one direction to ensure that intersecting traffic has right of way through the intersection. Ideally, the waiting time for vehicles is minimized and vehicles are able to pass through intersections in an efficient manner. However, traffic signal timing is often established from a centralized location and the ebbs and flows of vehicular traffic may result in unnecessary waiting.

As such, there is a demand for an improved way to minimize waiting time at traffic signals. Optimally, the timing of traffic signals could be adjusted to accommodate changes in the balance of traffic flow through an intersection. In this way, vehicles can reach their destinations more efficiently and with minimal disruption to other vehicles.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for a predictive algorithm which may be used to predict the state, timing, duration, or periodicity of traffic signals such as the traffic signal used to indicate traffic signal states including: a red traffic signal state; a non-red traffic signal state, such as a green traffic signal state or a yellow traffic signal state; or a left turn traffic signal state or a right turn traffic signal state to indicate that vehicles on a roadway may respectively turn left or turn right. The predictive algorithm may use traffic signal data which may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via a wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, such as longitude, latitude, elevation, direction of travel, or speed, of the vehicle 1000. For example, the location unit includes a global positioning system (GPS) unit, such as a Wide Area Augmentation System (WAAS) enabled National Marine -Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as, a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, in some embodiments, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
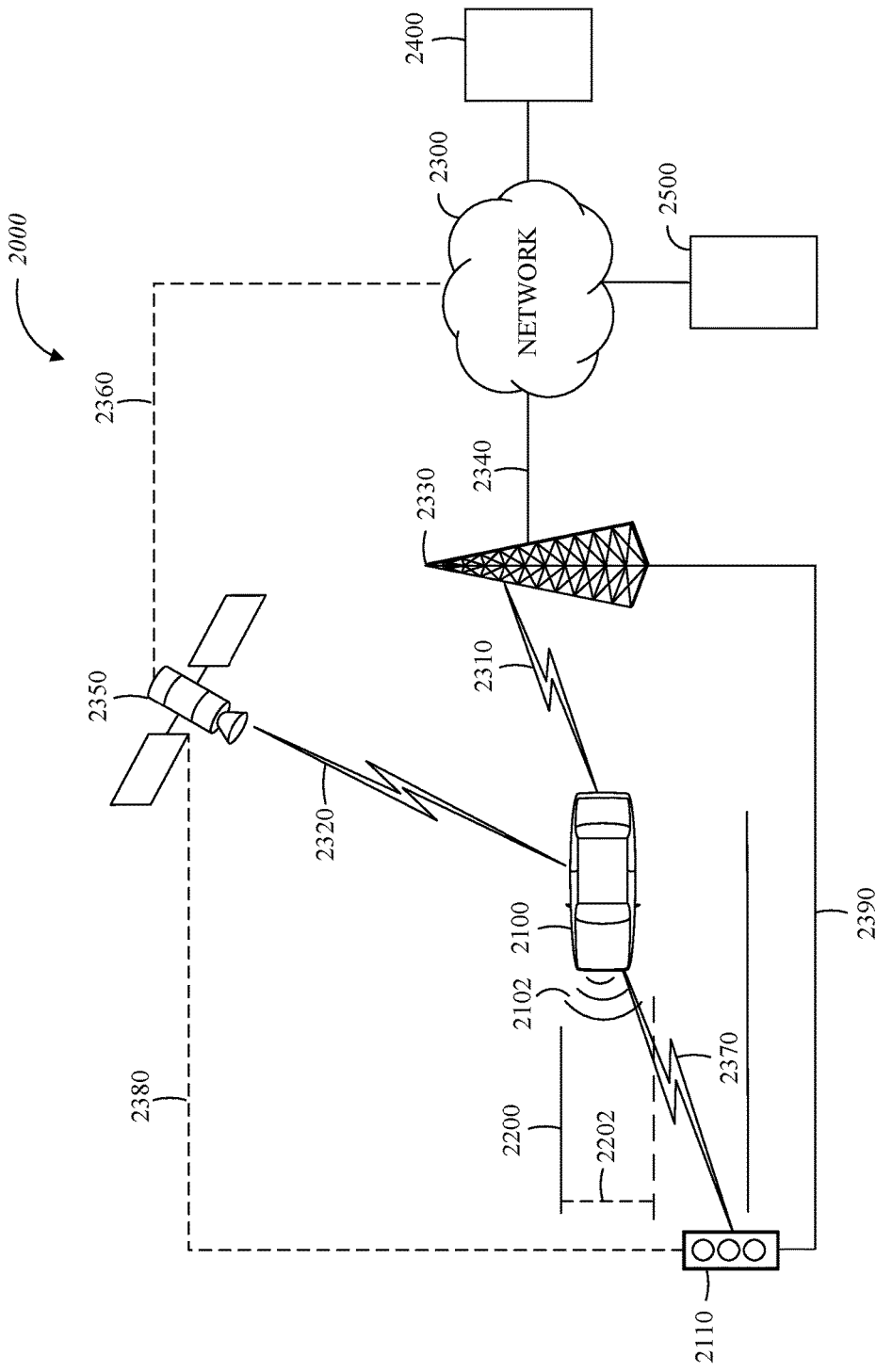
FIG. 2 is a diagram of an example of a portion of a vehicle transportation and communication system in which the aspects, features and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more traffic signals, such as a traffic signal 2110. The vehicle 2100 may travel via one or more portions of a transportation network 2200, and may communicate with the traffic signal 2110 via one or more of an electronic communication network 2300.

Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the traffic signal 2110, and a traffic management center 2400. For example, the vehicle 2100 or the traffic signal 2110 may receive information, such as information representing the transportation network 2200, from the traffic management center 2400 via the electronic communication network 2300.

In some embodiments, the traffic management center 2400 coordinates the state or timing of signals in traffic signals such as traffic signal 2110. The traffic management center 2400 may change the state, timing, duration, or periodicity of traffic signals including: periodically changing the state of the traffic signal to a red traffic signal state for a red traffic signal time period in order to indicate that a vehicle such as the vehicle 2100 is prohibited from advancing past a predetermined area such as an area within a predetermined radius of a traffic signal such as the traffic signal 2110; periodically changing the state of the traffic signal to a non-red traffic signal state (such as a green traffic signal state or a yellow traffic signal state), for a predetermined time period before a red traffic signal time period begins, in order to indicate that a vehicle such as the vehicle 2100 is permitted to advance past a traffic signal such as the traffic signal 2110.

In some embodiments, the traffic management center 2400 may exchange (send or receive) traffic signal data with vehicles or computing devices such as the vehicle 2100, the traffic signal 2110, or a server computing device 2500, via a wireless communication link 2380 or a wired communication link 2390.

In some embodiments, a traffic signal such as the traffic signal 2110 includes one or more traffic management controllers including: a pre-set traffic management controller in which the state, timing, duration, or periodicity of the red traffic signal state and the non-red traffic signal state may be pre-programmed or preset; or an adaptive controller in which a combination of data from roadway sensors, such as inductive loop detectors, and pre-set traffic signal parameters, such as a maximum non-red traffic signal state time, may be used determine when to change the traffic signal to a red traffic signal state or the non-red traffic signal state.

In some embodiments, the server computing device 2500 may include one or more server computing devices which may exchange (send or receive) traffic signal data with one or more vehicles or computing devices including the vehicle 2100, the traffic signal 2110, or the traffic management center 2400, via the electronic communication network 2300. Further, the server computing device 2500 may operate one or more predictive algorithms which may be used to predict the state, timing, duration, or periodicity of traffic signals such as the traffic signal used to indicate traffic signal states including: a red traffic signal state; a non-red traffic signal state, such as a green traffic signal state or a yellow traffic signal state; or a left turn traffic signal state or a right turn traffic signal state to indicate that vehicles on a roadway may respectively turn left or turn right.

In some embodiments, the vehicle 2100 or the traffic signal 2110 communicates via a wired communication link (not shown), a wireless communication link 2310/2320/2370, or a combination of any number of wired or wireless communication links. For example, as shown, a vehicle 2100 or a traffic signal 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle 2100 or a traffic signal 2110 may communicate with another vehicle 2100 or traffic signal 2110. For example, a host, or subject, vehicle 2100 may receive one or more automated inter-vehicle messages, such as a basic safety message (BSM), from a traffic signal 2110, via a direct communication link 2370, or via an electronic communication network 2300. For example, the traffic signal 2110 may broadcast the message to host vehicles within a defined broadcast range, such as 300 meters. In some embodiments, the vehicle 2100 receives a message via a third party, such as a signal repeater (not shown) or another remote vehicle (not shown). In some embodiments, a vehicle 2100 or traffic signal 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the traffic management center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. A satellite 2350, which may include a computing device, may be configured to communicate with a vehicle 2100, with the electronic communication network 2300, with the traffic management center 2400, or with a combination thereof via one or more communication links 2320/2360. Although shown as a single unit, a satellite can include any number of interconnected elements.

An electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments the vehicle 2100 communicates with the traffic management center 2400 via electronic communication network 2300, access point 2330, or satellite 2350. The traffic management center 2400 may include one or more computing devices, which are able to exchange (send or receive) traffic signal data from: vehicles such as the vehicle 2100; traffic signals such as the traffic signal 2120; or computing devices such as the server computing device 2500.

In some embodiments, a vehicle 2100 identifies a portion or condition of the transportation network 2200. For example, the vehicle may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

A vehicle 2100 may traverse one or more portions of the transportation network 2200 using information communicated via the electronic communication network 2300, such as information representing the transportation network 2200, information identified by one or more on-vehicle sensors 2102, or a combination thereof. The traffic signal 2110 may be capable of all or some of the communications and actions described above with respect to the vehicle 2100.

For simplicity, FIG. 2 shows the vehicle 2100 as the host vehicle, the traffic signal 2110, the transportation network 2200, the electronic communication network 2300, and the traffic management center 2400. However, any number of vehicles, networks, or computing devices may be used. In some embodiments, the vehicle transportation and communication system 2000 includes devices, units, or elements not shown in FIG. 2. Although a vehicle 2100 or traffic signal 2110 is shown as a single unit, a vehicle can include any number of interconnected elements.

Although the vehicle 2100 is shown communicating with the traffic management center 2400 via the electronic communication network 2300, the vehicle 2100 (and traffic signal 2110) may communicate with the traffic management center 2400 via any number of direct or indirect communication links. For example, the vehicle 2100 or traffic signal 2110 may communicate with the traffic management center 2400 via a direct communication link, such as a Bluetooth communication link.

Although, for simplicity, FIG. 2 shows one of the transportation network 2200, and one of the electronic communication network 2300, any number of networks or communication devices may be used. In some implementations, the vehicle transportation and communication system 2000 may include devices, units or elements not shown in FIG. 2. Although the vehicle 2100 and the traffic signal 2110 are shown as a single unit, the vehicle 2100 or the traffic signal 2110 may include any number of interconnected elements.

The steps, or operations, of any method, process, or algorithm described in connection with the implementations of the disclosed technology herein, may be implemented in hardware, firmware, software executed by hardware, circuitry, or any combination thereof. To facilitate explanation, method 3000 is depicted and described as a series of operations. However, the steps in accordance with this disclosure may occur in various orders or concurrently. Additionally, operations in accordance with this disclosure may occur with other operations not presented and described herein.

Figure 3:
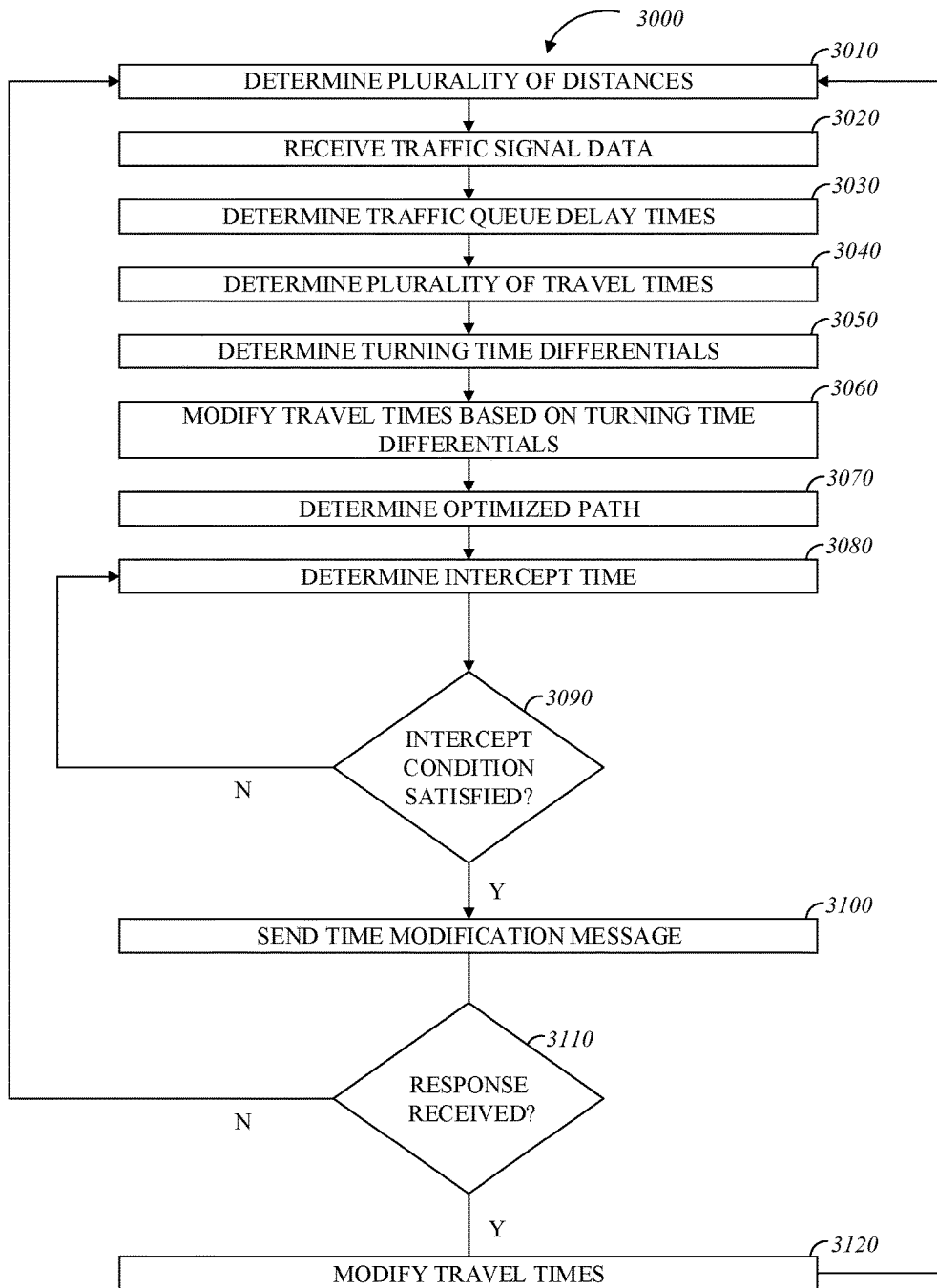
FIG. 3 is a flow chart of an optimized driving time system based on traffic signal information according to the teachings herein.

FIG. 3 is a flow chart of a method 3000 for optimizing driving time based on traffic signals according to the teachings disclosed herein. In some implementations, the method for optimizing driving time based on traffic signals may be implemented in a vehicle, such as the vehicle 1000 shown in FIG. 1, or the vehicle 2100 shown in FIG. 2. In some implementations the method for optimizing driving time based on traffic signals may be implemented in a computing device or computing apparatus such as the controller 1300 shown in FIG. 1. In an implementation, some or all aspects of the method for optimizing driving time based on traffic signals may be implemented in a system combining some or all of the features described herein.

Method 3000 begins at step 3010, at which a vehicle such as the vehicle 1000 determines a plurality of distances corresponding to a plurality of paths between a vehicle location and a destination location for the vehicle 1000.

In an implementation, the determination of distances by the vehicle 1000 is based on route data such as map data, which indicates the position of an object with respect to another object. As an example, route data includes: geographical coordinates; distances between different geographical coordinates along a path such as a roadway; traffic regulation data for a predetermined geographical area; and the position of traffic signals, such as the traffic signal 2110 illustrated in FIG. 2, at geographical positions in a predetermined area. In this example, the route data includes a map of a predetermined area that includes the location of the vehicle 1000 location and the destination location.

In an implementation, the route data further includes path condition data that is based on the state of one or more objects external to the vehicle on the plurality of paths. The condition data may include the state of one or more traffic signals along the plurality of paths. For example, the path condition data may include an indication of the state of one or more of the traffic signals along the plurality of paths, including whether one or more traffic signals are inoperative or malfunctioning.

In an implementation, the path condition data further includes an indication of the state of external objects in a predetermined area around a traffic signal such as may be captured by a sensor in the traffic signal or a sensor in the vehicle 1000 such as the sensor 1360. As an example, a camera on a traffic signal may capture still images or video images that provide an indication of the state of the external environment that is viewable by the camera. In this way, the path condition data may indicate the occurrence of a queue of vehicles, or other conditions in the predetermined area around the traffic signal including vehicle stoppage data, construction activity data, lane closure data, road surface condition data, pedestrian activity data, or traffic signal timing data.

At step 3020, the vehicle 1000 may receive traffic signal data which includes a plurality of traffic signal states for a plurality of traffic signals on the plurality of paths. In an implementation, the traffic signal data may be: stored in the vehicle 1000 for use by a predictive algorithm which may be performed by the controller 1300 in vehicle 1000; received from a traffic management center such as the traffic management center 2400; or received from a server computing device such as the server computing device 2500. In an implementation, the plurality of traffic signal states includes an indication the state of the traffic signal at the time the traffic signal data was sent as well as an indication of the timing of the traffic signal states.

As an example, a traffic light may send an indication that the traffic signal is in a red traffic signal state to indicate that vehicles such as vehicle 1000 are not permitted to proceed past the traffic signal until a red traffic signal time period elapses and the red traffic signal state is suspended for a predetermined time period.

In an implementation, the plurality of red traffic signal states may provide an indication that when the vehicle 1000 is within a predetermined distance of one of the plurality of traffic signals, the vehicle 1000 is requested to stop until the red traffic signal time period elapses. As an example, a traffic signal may have a traffic signal cycle that includes: a twenty second red traffic signal time period, to indicate that a vehicle such as the vehicle 1000 is not permitted to proceed past the traffic signal; and a twenty second non-red traffic signal time period to indicate that the red traffic signal state is suspended and that a vehicle such as the vehicle 1000 is permitted to proceed past the traffic signal. As an example, the twenty second non-red traffic signal time period may include a fifteen second green traffic signal time period, immediately following the red traffic signal time period, and a five second yellow traffic signal time period, immediately following the green traffic signal time period and immediately preceding the beginning of a red traffic signal time period when the red traffic signal state is removed from suspension.

In an implementation, the traffic signal data may include past traffic signal data including an indication of traffic signal states for a predetermined time period in the past or future traffic signal data including an indication of traffic signal states for a predetermined time period in the future. The past traffic signal data or the future traffic signal data may be: stored locally, such as in the memory 1340 of the vehicle 1000; or received from a traffic data source such as the traffic management center 2400 or the server computing device 2500.

The past traffic signal data may include: an operational status for the traffic signal in the past, such as whether the traffic signal was operational or malfunctioning; past traffic signal timing for predetermined time periods such as holiday periods, weekends, or periods of heavy vehicular congestion. The future traffic signal data may include: scheduled downtime for the traffic signal, such as for maintenance or replacement; future timing of the traffic signal, such as during holidays periods, weekends, or periods of heavy vehicular congestion. The future traffic signal data may be used to make more accurate determinations of the state of a traffic signal, and a predetermined area around the traffic signal, at the time the vehicle 1000 approaches or arrives at the traffic signal.

At step 3030, the vehicle 1000 determines a plurality of traffic queue delay times for the plurality of paths. The plurality of traffic queue delay times is based on a number of objects within a predetermined distance of the plurality of traffic signals or a velocity of the objects within the predetermined distance of the plurality of traffic signals. As an example, sensors in the vehicle 1000, such as the sensor 1360 illustrated in FIG. 1, or path condition data from the traffic signal, may provide an indication of the number and velocity of objects, such as vehicles or pedestrians, are within the predetermined distance.

In this way, when multiple vehicles are queued as the vehicles wait for a traffic signal to change from red traffic signal state to a non-red traffic signal state, the vehicle 1000 may determine how the queue of vehicles will affect the ability of the vehicle 1000 to proceed before the traffic signal state changes back to the red traffic signal state.

In an implementation, the vehicle 1000 reduces or prunes a predetermined portion of the plurality of paths to include the plurality of paths corresponding to the plurality of traffic signals with a traffic queue delay time that is less than a predetermined traffic queue delay threshold. In this way, the vehicle 1000 may reduce the computational burden of determining travel times for the plurality of paths.

At step 3040, the vehicle 1000 determines a plurality of travel times corresponding to a predetermined portion of the plurality of paths based on the plurality of distances and the plurality of traffic signal states. In an implementation, the vehicle 1000 estimates a travel time for each of the plurality of paths. The travel time for the path is based on travel time factors including: the route data; the path condition data; the traffic signal data; the distance between the vehicle location and the destination location along the respective path; changes in the traffic signal states as the vehicle travels along the path; and the vehicle velocity.

In an implementation, the plurality of travel times may be expressed in various ways including: an estimated time period, such as one minute, five seconds; or an estimated time of arrival, such as 1:05.10 p.m.

At step 3050, the vehicle 1000 determines a plurality of turning time differentials for the plurality of paths. In an implementation, the plurality of turning time differentials are based on turning time differential factors including: a difference between an estimated velocity of the vehicle 1000 travelling on a straight portion of the plurality of paths and an estimated velocity of the vehicle 1000 when turning on one of the plurality of paths, such as at an intersection; an estimate of the additional time added to the travel time to the destination, due to the vehicle 1000 decelerating before negotiating a turn; and an estimate of the additional time added to the travel time due to the vehicle 1000 accelerating to achieve the velocity of vehicle 1000 prior to negotiating a turn.

In an implementation, the vehicle 1000 stores: the actual velocity of the vehicle 1000 travelling on a straight portion of the plurality of paths; and the actual velocity of the vehicle 1000 as the vehicle 1000 negotiates a turn on a curved portion of a path. For each of the plurality of paths, the vehicle 1000 is able to determine or calculate a turning time differential based on stored actual velocity of the vehicle on straight portions of a path and curved portions of a path.

At step 3060, the vehicle 1000 modifies, the plurality of travel times based on the plurality of turning time differentials. In an implementation, modifying the plurality of travel times includes adding the turning differential times to the corresponding plurality of paths.

As an example, if a path between the vehicle location and the destination location is a straight path, with no intersections, and no intervening traffic signals, then the turning time differential would be a low value. As another example, if the path between the vehicle location and the destination location has three intersections which are negotiated by a left turn, a right turn, and a left turn, respectively, then the turning time differential would include the additional time expended by the vehicle 1000 to slow down at each intersection in order to negotiate the three turns. In an implementation, the turning time differential may be weighted by a weighting factor that may increase or decrease the turning time differential.

At step 3070, the vehicle 1000 determines an optimized path between the vehicle location and the destination location based on the path of the plurality of paths that corresponds to the lowest or shortest travel time of the plurality of travel times. In this way, the vehicle 1000 minimizes travel time between the vehicle location and the destination location.

At step 3080, the vehicle 1000 determines an intercept time period based on intercept factors including a velocity of the vehicle 1000 and the distance between the vehicle 1000 and the nearest one of the plurality of traffic signals on the optimized path. In an implementation, the intercept time period includes an estimated amount of time for the vehicle to arrive at the nearest one of the plurality of traffic signals on the optimized path based on traffic signal data which may be stored locally in a memory such as the memory 1340 of the vehicle 1000 or received by the vehicle 1000 from a traffic signal data source such as the traffic management center 2400, or the server computing device 2500, which may transmit the traffic signal data via a communication network or one of the plurality of traffic signals on the optimized path.

In an implementation, the vehicle 1000 determines the velocity of the vehicle 1000 based on sensor data from a sensor such as the sensor 1360 illustrated in FIG. 1, which may indicate the current velocity of the vehicle 1000. In an implementation, the intercept factors further include the route data, the path condition data, or the traffic signal data.

At step 3090, the vehicle 1000 determines whether an intercept condition has been satisfied including a determination of whether the red traffic signal time period begins before the intercept time period elapses or whether the red traffic signal time period does not elapse before the intercept time period elapses. In an implementation, the determination of whether the intercept condition has been satisfied includes a comparison of the intercept time period to: the remaining red traffic signal time period; or the remaining non-red traffic signal time period before the red traffic signal time period begins. When the intercept condition is satisfied, the Yes branch is taken to step 3100. When the intercept condition is not satisfied, the No branch is taken to step 3080.

At step 3100, the vehicle 1000 sends a time modification message to a traffic signal control device associated with the nearest one of the plurality of traffic signals on the optimized path. The time modification message includes time modification data that is transmitted to the traffic signal or to a traffic management center such as the traffic management center 2400 illustrated in FIG. 2.

In an implementation, the time modification message includes a request to change the state, timing, period, or duration of a traffic signal, including: a request to increase the amount of time before the red traffic signal time period begins; a request to decrease the amount of time before the red traffic signal time period elapses; a request to decrease the amount of time before the red traffic signal time period begins; a request to increase the amount of time before the red traffic signal time period elapses.

In an implementation, when the intercept condition, such as the red traffic signal time period beginning before the intercept time period elapses or the red traffic signal time period not elapsing before the intercept time period elapses, has been satisfied, the vehicle 1000 increases the velocity of the vehicle to arrive at the nearest one of the plurality of traffic signals on the optimized path before the intercept time period elapses.

In an implementation, the vehicle 1000 may stop increasing the velocity of the vehicle 1000 when the velocity of the vehicle 1000 attains a predetermined maximum velocity. As an example, the predetermined maximum velocity may be based on factors including: a traffic regulation such as a speed limit; zoning regulations determining the maximum speed permitted in a geographic area; or a predetermined maximum velocity based on the electrical or mechanical capabilities of vehicle 1000.

At step 3110, the vehicle 1000 determines whether an affirmative response to the time modification message sent by vehicle 1000 was received from the traffic signal. In an implementation, the traffic signal may be received by a communication apparatus such as a transceiver or the electronic communication unit 1320 illustrated in FIG. 1. Upon receiving an affirmative response to the time modification message from the traffic signal, the Yes branch is taken to step 3120. Upon not receiving an affirmative response or receiving a negative response, to the time modification message, from the traffic signal, the No branch is taken to step 3010.

In an implementation, vehicle 1000, when a response from the traffic signal is not received within a predetermined response time period, the vehicle 1000 can resend the time modification message to the traffic signal a predetermined number of times. Responsive to the vehicle 1000 not receiving a response to the time modification message after sending the time modification message to the traffic signal the predetermined number of times, the vehicle 1000 can determine that no response from the traffic signal is forthcoming and will take the No branch to step 3010.

At step 3120, upon receiving a response to the time modification message that includes an amount of modification time, the vehicle 1000 modifies the plurality of travel times based on the amount of modification time indicated in the response to the time modification message. In an implementation, the amount of modification time in the response to the time modification message indicates an increase in the amount of time before the red traffic signal time period begins or a decrease in the amount of time before the red traffic signal time period elapses. In an example, the amount of modification time may be expressed as: a duration of time, such as seconds or minutes; or as a specific time period such as one hour, eleven minutes, and 48.50 seconds through one hour, eleven minutes, and 52.50 seconds (a time period of four seconds) during which the extension of time will occur. After modifying the plurality of travel times, the method 3000 may end or continue in step 3040. In an implementation, the response to the time modification message may indicate that no change has been made to the timing of the traffic signal states.

Figure 4:
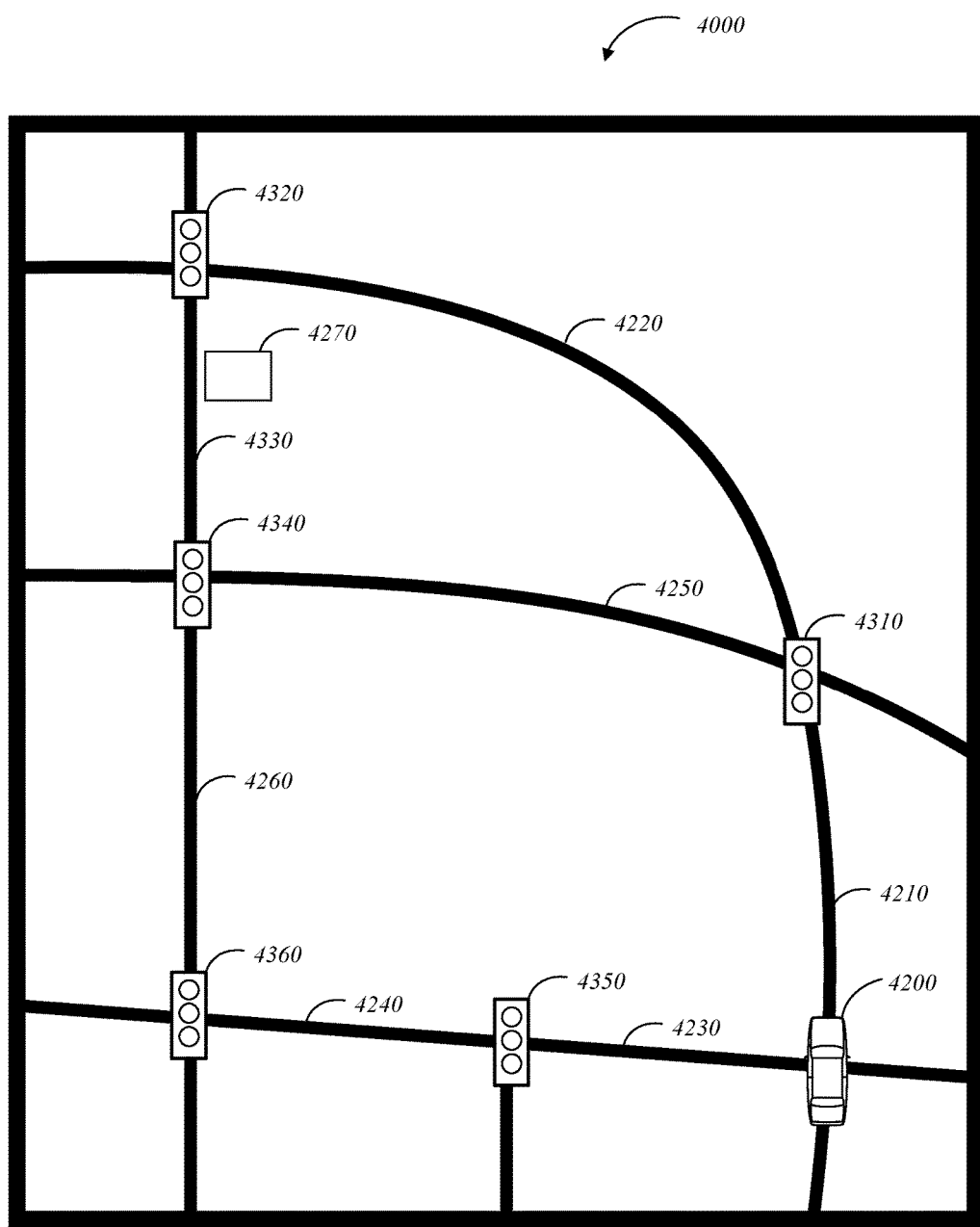
FIG. 4 is a top plan view illustrating a vehicle utilizing the optimized driving time system within a portion of a vehicle transportation network in accordance with this disclosure.

FIG. 4 is a diagram illustrating an example of a method for optimizing driving time based on traffic signals in an environment 4000 which includes: a vehicle 4200, such as the vehicle 1000 illustrated in FIG. 1 or the vehicle 2100 illustrated in FIG. 2; a path section 4210; a path section 4220; a path section 4230; a path section 4240; a path section 4250; and a path section 4260. As illustrated, the vehicle 4200 has a starting location at the intersection of the path section 4210 and the path section 4230. The vehicle 4200 determines that there is more than one path to the destination 4270 including three paths between the vehicle location (at the intersection of the path section 4210 and the path section 4230) and the destination 4270 that satisfy a vehicle path criterion.

In an implementation, the vehicle 4200 can determine any number of paths between two locations and may constrain the determined number of paths based on the vehicle path criterion including: that the paths do not traversed more than once; that the paths do not exceed a path distance threshold; that the paths do not exceed a travel time threshold; and that the paths are within a predefined geographical area.

In this example, the vehicle 4200 determines that the three paths from the vehicle starting location to the destination 4270 are: path 1, via the path section 4210 to the traffic signal 4310, the path section 4220 to the traffic signal 4320, and the path section 4330 to the destination 4270; path 2, via the path section 4210 to the traffic signal 4310, the path section 4250 to the traffic signal 4340, and the path section 4330 to the destination 4270; and path 3, via the path section 4230 to the traffic signal 4350, the path section 4240 to the traffic signal 4360, the path section 4260 to the traffic signal 4340, and the path section 4330 to the destination 4270.

The vehicle 4200 determines travel times for path 1, path 2, and path 3, based on travel time factors including: the distances of path 1, path 2, and path 3 (path 1 is the shortest path); the state of: the traffic signal 4310, the traffic signal 4320, the traffic signal 4350, the traffic signal 4360, and the traffic signal 4340 (path 2 has the shortest aggregate red traffic signal time period); turning differentials (path 3 has the fewest turns and adds the least time due to turning the vehicle 4200); and path condition data which indicates that traffic signal 4310 and traffic signal 4320 have the lowest amount of vehicular and pedestrian congestion. Based on the travel time factors, the vehicle 4200 determines that path 3 is the path with the shortest travel time and selects path 3 as the optimal or optimized path.

Figure 5:
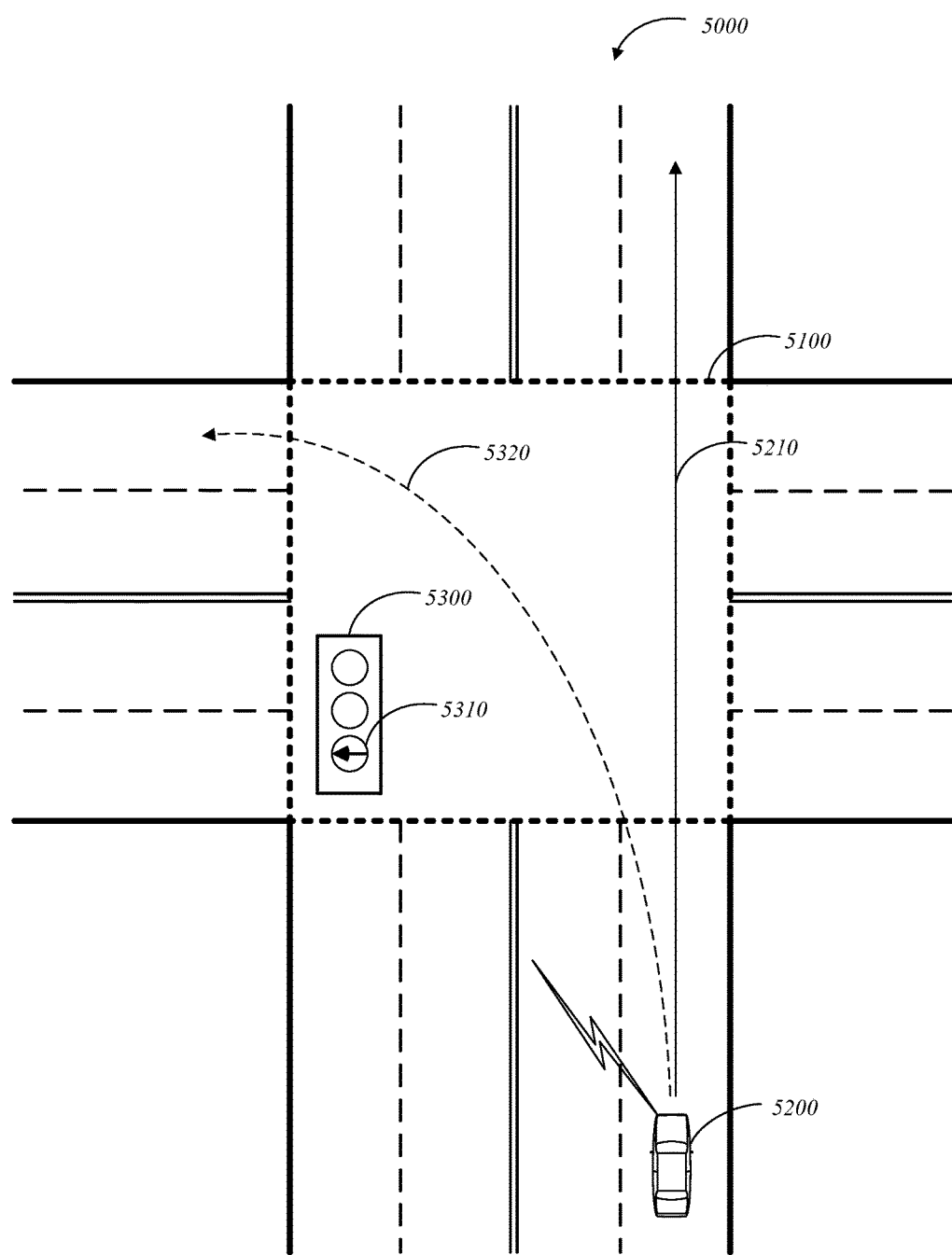
FIG. 5 is a diagram illustrating a vehicle at an intersection with a traffic signal in a left turn signal state within a portion of a vehicle transportation network in accordance with this disclosure.

FIG. 5 is a diagram illustrating an example of a method for optimizing driving time based on traffic signals in an environment 5000 that includes an intersection 5100. As shown, a vehicle 5200 may include the features of the vehicle 1000 illustrated in FIG. 1 or the features of the vehicle 2100 illustrated in FIG. 2. In this example, the vehicle 5200 is in transit on a path 5210 and determines, based on traffic signal data received from the traffic signal 5300 that the traffic signal state indicates that the left turn traffic signal state 5310 will be active for another five seconds until the red traffic signal time period begins. Vehicle 5200 determines, based on the vehicle velocity of sixty kilometers per hour, that the time until the vehicle 5200 arrives at the intersection 5100 is ten seconds. As such, the vehicle 5200 determines that the vehicle 5200 will not arrive at the intersection before the red traffic signal time period begins.

The traffic signal data indicates that the red traffic signal time period on traffic signal 5300 will have a duration of twenty seconds, which the vehicle 5200 determines will exceed the fifteen seconds of additional time that the vehicle 5200 will expend to arrive at the destination via the path 5210 instead of the path 5320. Accordingly, the vehicle 5200 sends a time modification message to request a seven second delay to the beginning of the red traffic signal state time period, which would permit the vehicle 5200 to proceed through the intersection before the red traffic signal state begins.

In this example, the response to the time modification message sent via the traffic signal 5300, indicates that the traffic signal state will not remain in the green left turn signal state for an additional seven seconds (the request for additional time before the start of the red traffic signal state begins was refused) and that the traffic signal state will change to a green traffic signal state for a period of six seconds immediately following the left turn traffic signal state. Accordingly, the vehicle 5200 proceeds along the path 5210, which is an alternate route that will allow the vehicle 5200 to arrive at the destination location in less time than if the vehicle 5200 waits for the red traffic signal time period to elapse and for the traffic signal 5300 to return to the green left turn traffic signal state 5310.

Figure 6:
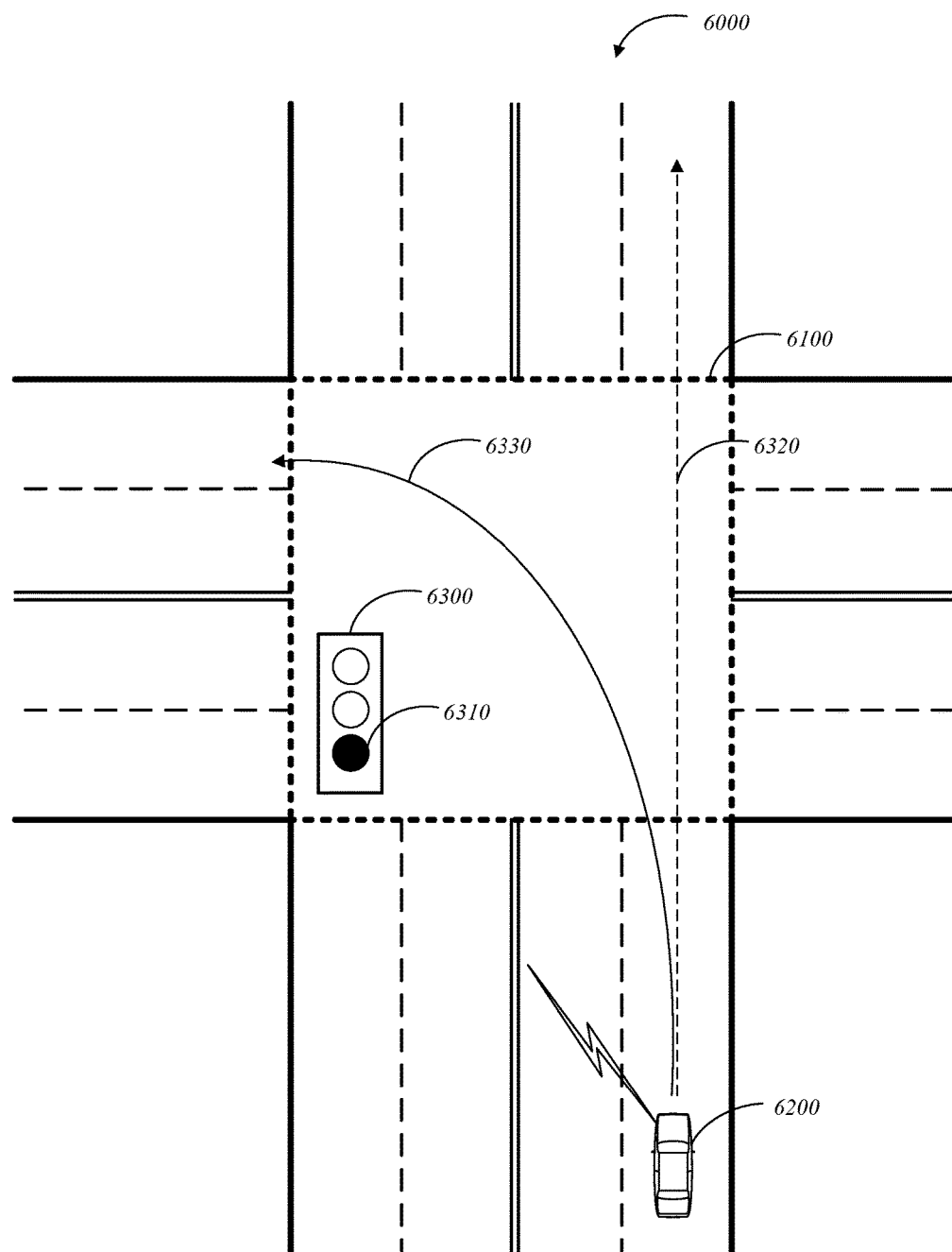
FIG. 6 is a diagram illustrating a vehicle at an intersection with a traffic signal in a non-red traffic signal state within a portion of a vehicle transportation network in accordance with this disclosure.

FIG. 6 is a diagram illustrating an example of a method for optimizing driving time based on traffic signals in an environment 6000 that includes an intersection 6100. As an example, the vehicle 6200 receives traffic signal data via the traffic signal 6300. The traffic signal data indicates that the traffic signal 6300 is in a non-red (green) traffic signal state 6310 and that the red traffic signal time period will begin in five seconds. The vehicle 6200 determines that the vehicle 6200 will arrive at the traffic signal in two seconds and that the vehicle 6200 will take two seconds to navigate the left turn across the intersection 6100. Accordingly, the vehicle 6200 determines that proceeding on the path 6330 will result in a lower or shorter travel time to the destination than proceeding along the path 6320. In this example, the vehicle 6200 turns left and proceeds on the path 6330.

Figure 7:
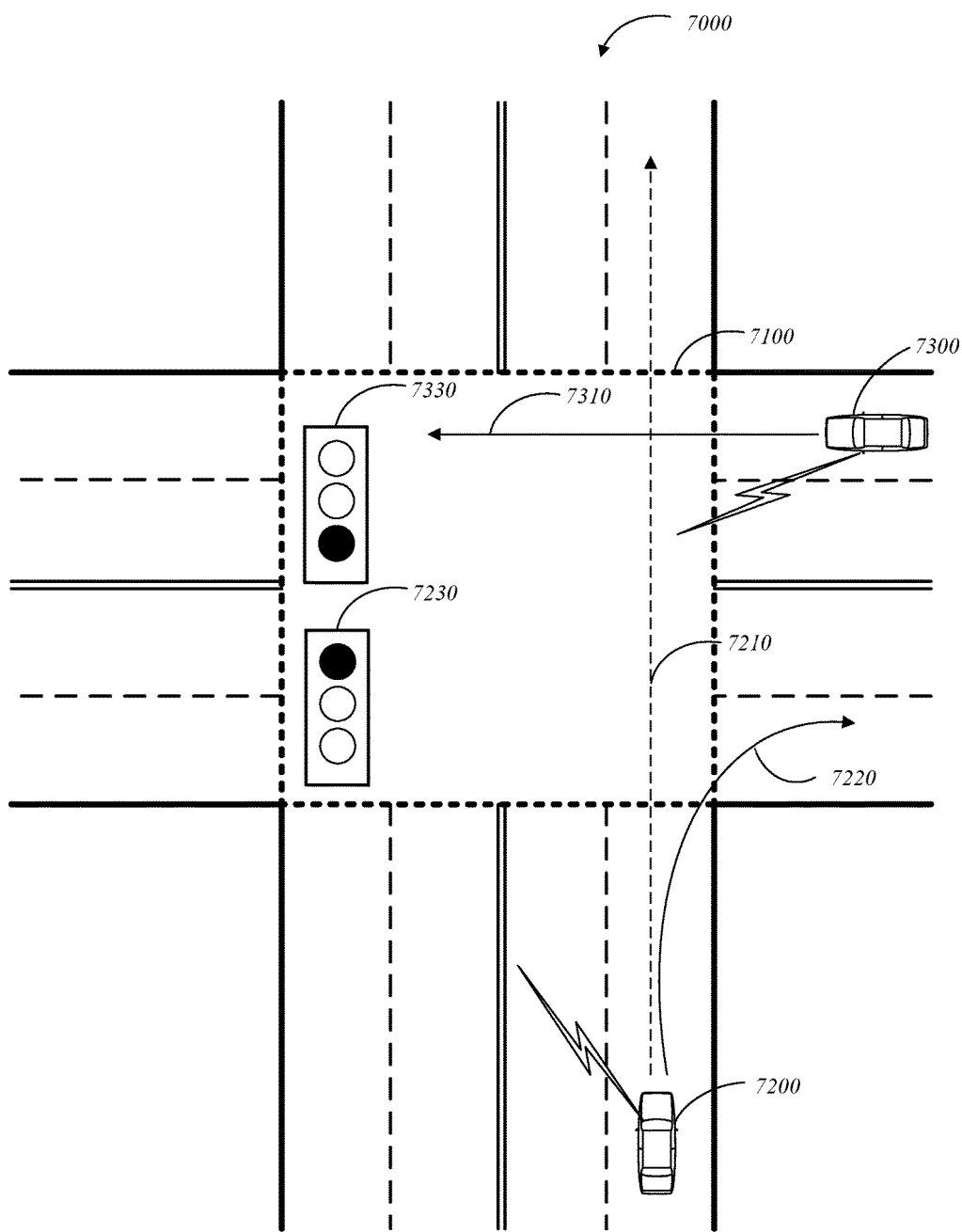
FIG. 7 is a diagram illustrating two vehicles utilizing traffic signal data to negotiate a set of traffic signals at an intersection within a portion of a vehicle transportation network in accordance with this disclosure.

FIG. 7 is a diagram illustrating an example of a method for optimizing driving time based on traffic signals in an environment 7000 which includes an intersection 7100 and a vehicle 7200 proceeding on a path 7210 that will result in a shortest travel time to a destination. An alternative path 7220 is available to the vehicle 7200 as the path with the second shortest travel time to the destination. As the vehicle 7200 approaches the intersection 7100, the vehicle 7200 determines that the vehicle 7200 will arrive at the intersection 7100 in five seconds.

Vehicle 7200 sends a traffic state request message to the traffic signal 7230 and in response the traffic signal 7230 sends traffic signal data indicating that the traffic signal is in a red traffic signal state and that the red traffic signal time period will elapse in ten seconds. Because the red traffic signal time period will elapse five seconds after the vehicle 7200 arrives at the intersection 7100, the vehicle 7200 sends a time modification message to the traffic signal 7230. The time modification message sent by the vehicle 7200 includes a request to reduce the red traffic signal time period at the traffic signal 7230 by five seconds in order that the vehicle 7200 may proceed straight through the intersection 7100 on the path 7210 without having to stop at the intersection 7100.

At the same time that the vehicle 7200 is approaching the intersection 7100, the vehicle 7300 approaches the intersection 7100 on a path 7310 and determines that the vehicle 7300 will arrive at the intersection 7100 in twelve seconds. The vehicle 7300 sends a traffic state request to a traffic signal 7330.

The traffic signal 7330 is coordinated with the traffic signal 7230, so that when the traffic signal 7330 is in a red traffic signal state, the traffic signal 7230 is not in a red traffic signal state, and when the traffic signal 7330 is not in a red traffic signal state, the traffic signal 7230 is in a red traffic signal state.

In response to the traffic state request from the vehicle 7300, the traffic signal 7330 sends traffic signal data indicating that the traffic signal 7330 is not in a red traffic signal state and that the red traffic signal state for the traffic signal 7330 will begin in ten seconds. The vehicle 7300 determines that the red traffic signal state will begin two seconds before the vehicle 7300 arrives at the intersection 7100, and so the vehicle 7300 sends a time modification message to the traffic signal 7330. The time modification message sent by the vehicle 7300 includes a request to increase the time before the red traffic signal state by five seconds in order that the vehicle 7300 may proceed straight through the intersection 7100 on the path 7310 without having to stop at the intersection 7100.

In this example, the traffic signal 7230 and the traffic signal 7330 send traffic signal data, including a response to the time modification message sent from the vehicle 7200 and the time modification message sent from the vehicle 7300. The traffic signal data indicates that the request (to increase the time before the red traffic signal state in the traffic signal 7330 by five seconds) in the traffic modification message sent by the vehicle 7300 is granted and the vehicle 7300 proceeds through the intersection 7100 on the path 7210.

In an implementation, the vehicle 7200 and the vehicle 7300 may negotiate the duration of time modification in a time modification message based on negotiation factors including the proximity of a vehicle to the traffic signal, the velocity of the vehicle, and the number of granted time modification requests within a predetermined time period.

Figure 8:
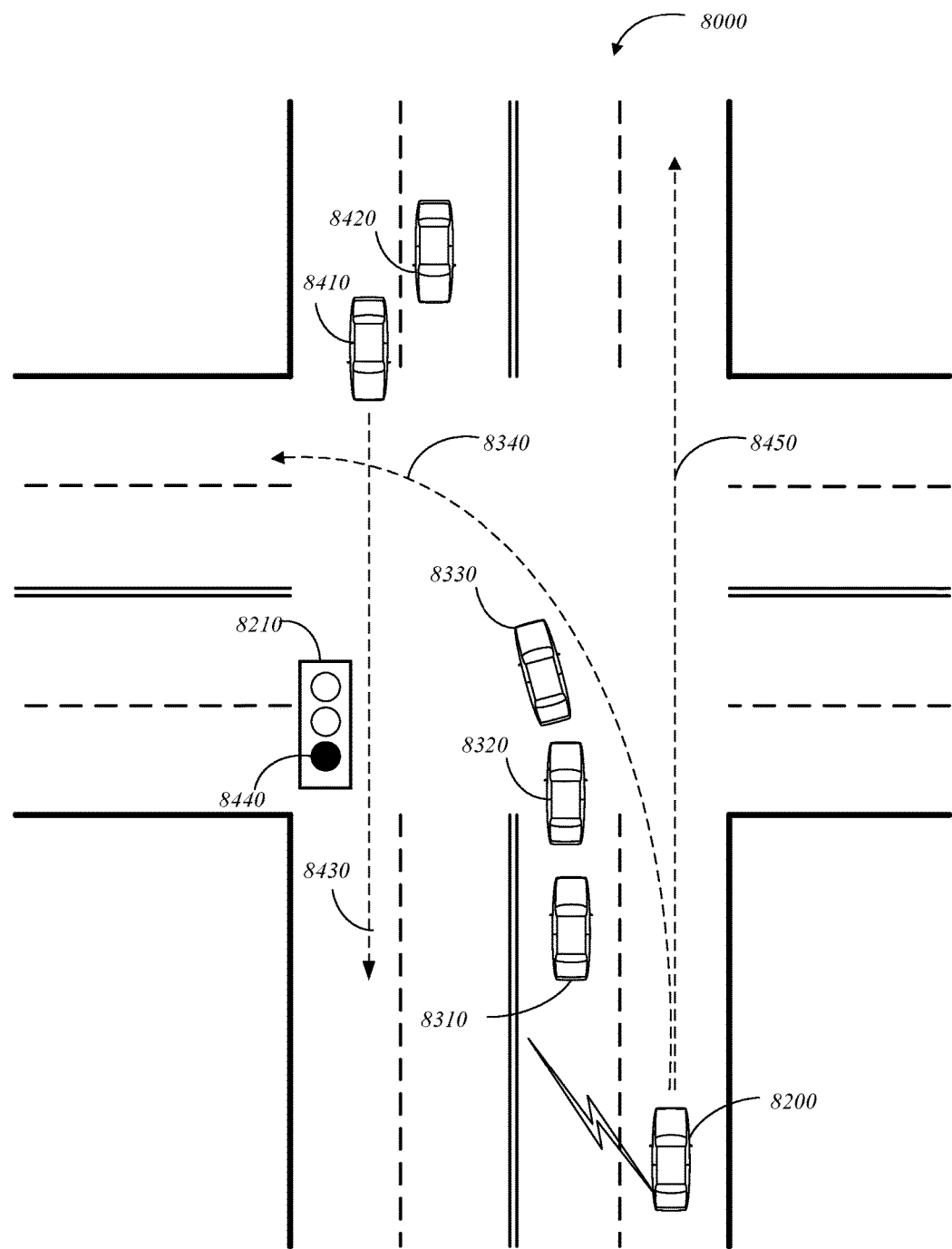
FIG. 8 is a diagram illustrating a vehicle utilizing traffic signal data to traverse an intersection with a queue of vehicles within a portion of a vehicle transportation network in accordance with this disclosure.

FIG. 8 is a diagram illustrating an example of a method for optimizing driving time based on traffic signals in an environment 8000. Based on sensor data from a sensor (such as the sensor 1360 illustrated in FIG. 1) in a vehicle 8200 or traffic signal data sent from a traffic signal 8210, the vehicle 8200 determines that a queue including a vehicle 8310, a vehicle 8320, and a vehicle 8330, has formed, thereby blocking the passage of the vehicle 8200 on a path 8340. In this example, the queue was formed to permit the passage of a vehicle 8410 and a vehicle 8420 in the direction of the path 8430 which intersects the path 8340.

Based on the velocity of the vehicle 8330 (at the front of the queue) the vehicle 8200 determines that the vehicle 8200 is eight seconds from the traffic signal 8210 and that the queue will result in a queue delay time of thirty seconds. Further, the traffic signal data determined by the prediction algorithm, or received by the vehicle 8200 from the traffic signal 8210 indicates, that the traffic signal 8210 is in a non-red traffic signal state 8440, and that the red traffic signal time period will begin in ten seconds. The vehicle 8200 determines that proceeding on a path 8450 will result in a lower or shorter travel time to the destination than continuing on the path 8340. Accordingly, the vehicle 8200 proceeds on the path 8450.

The disclosed technology offers the benefits of a vehicle that is able to more efficiently traverse a transportation network by using traffic signal information. The disclosed technology is capable of reducing waiting times at traffic intersections and increasing the throughput of traffic by more efficiently receiving traffic signal information and sending requests to modify the timing of traffic signals. Further, the disclosed technology may improve the performance of the vehicle by reducing the number of times the vehicle decelerates, stops, and accelerates, thereby reducing wear and tear on the vehicle's braking system, engine, and structural components.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for optimizing driving time, the method comprising:
   determining, by a processor, based on route data, a plurality of distances corresponding to a plurality of paths for a vehicle between a vehicle location and a destination location, wherein the route data includes a map of a predetermined area including the vehicle location and the destination location;
   receiving, by the processor, traffic signal data including a plurality of traffic signal states for a plurality of traffic signals on the plurality of paths, wherein receiving the traffic signal data includes receiving the traffic signal data from an external traffic signal data source via an electronic communication link;
   determining, by the processor, a plurality of travel times corresponding to a predetermined portion of the plurality of paths based on the plurality of distances and the plurality of traffic signal states; and
   determining, by the processor, an optimized path between the vehicle location and the destination location based on the path of the plurality of paths that corresponds to a shortest travel time of the plurality of travel times.

2. The method of claim 1, wherein the plurality of traffic signal states includes a plurality of red traffic signal states to indicate that a red traffic signal time period has not elapsed, wherein the plurality of red traffic signal states indicates that when the vehicle is within a predetermined distance of a corresponding one of the plurality of traffic signals, the vehicle is requested to stop until the red traffic signal time period elapses.

3. The method of claim 2, further comprising:
   determining, by the processor, for the plurality of paths, a plurality of traffic queue delay times based on a number of objects within a predetermined distance of the plurality of traffic signals or a velocity of the objects within the predetermined distance of the plurality of traffic signals, wherein the predetermined portion of the plurality of paths includes the plurality of paths corresponding to the plurality of traffic signals with a traffic queue delay time that is less than a predetermined traffic queue delay threshold.

4. The method of claim 2, further comprising:
   determining, by the processor, an intercept time period based on a velocity of the vehicle and the distance to a nearest one of the plurality of traffic signals on the optimized path, wherein the intercept time period is an amount of time for the vehicle to arrive at the nearest one of the plurality of traffic signals on the optimized path; and
   responsive to the red traffic signal time period beginning before the intercept time period elapses or the red traffic signal time period not elapsing before the intercept time period elapses, sending, by the processor, a time modification message to a traffic signal control device associated with nearest one of the plurality of traffic signals on the optimized path, wherein the time modification message includes a request to increase the amount of time before the red traffic signal time period begins or a request to decrease the amount of time before the red traffic signal time period elapses.

5. The method of claim 4, further comprising:
   responsive to receiving a response to the time modification message including an amount of modification time, modifying, by the processor, the plurality of travel times based on the amount of modification time indicated in the response to the time modification message, wherein the amount of modification time in the response to the time modification message indicates an increase in the amount of time before the red traffic signal time period begins or a decrease in the amount of time before the red traffic signal time period elapses.

6. The method of claim 4, further comprising:
   responsive to the red traffic signal time period beginning before the intercept time period elapses or the red traffic signal time period not elapsing before the intercept time period elapses, increasing, by the processor, the velocity of the vehicle to arrive at the nearest one of the plurality of traffic signals on the optimized path before the intercept time period elapses, wherein the increase in the velocity of the vehicle is stopped when the velocity of the vehicle attains a predetermined maximum velocity.

7. The method of claim 1, wherein the route data further includes path condition data based on a state of one or more objects external to the vehicle on the plurality of paths, wherein the plurality of travel times are further based on the path condition data.

8. The method of claim 7, wherein the path condition data further includes vehicle stoppage data, construction activity data, lane closure data, road surface condition data, pedestrian activity data, or traffic signal timing data.

9. The method of claim 1, further comprising:
   determining, by the processor, a plurality of turning time differentials for the plurality of paths, wherein the plurality of turning time differentials are based on a difference between a velocity of the vehicle travelling on a straight portion of the plurality of paths and a velocity of the vehicle when turning on an intersection of the plurality of paths; and
   modifying, by the processor, the plurality of travel times based on the plurality of turning time differentials.

10. A driving time optimization apparatus comprising:
    a non-transitory memory; and
    a processor configured to execute instructions stored in the non-transitory memory to:
        determine, based on route data, a plurality of distances corresponding to a plurality of paths for a vehicle between a vehicle location and a destination location, wherein the route data includes a map of a predetermined area including the vehicle location and the destination location;
        receive traffic signal data from an external traffic signal data source via an electronic communication link, the traffic signal data including a plurality of traffic signal states for a plurality of traffic signals on the plurality of paths;
        determine a plurality of travel times corresponding to a predetermined portion of the plurality of paths based on the plurality of distances and the plurality of traffic signal states; and determine an optimized path between the vehicle location and the destination location based on the path of the plurality of paths that corresponds to a shortest travel time of the plurality of travel times.

11. The apparatus of claim 10, wherein the plurality of traffic signal states includes a red traffic signal state to indicate that a red traffic signal time period has not elapsed, wherein the red traffic signal state indicates that when the vehicle is within a predetermined distance of one of the plurality of traffic signals in the red traffic signal state, the vehicle is requested to stop until the red traffic signal time period elapses.

12. The apparatus of claim 11, wherein the processor is further configured to execute instructions stored in the memory to:
  determine, for the plurality of paths, a plurality of traffic queue delay times based on a number of objects within a predetermined distance of the plurality of traffic signals or a velocity of the objects within the predetermined distance of the plurality of traffic signals, wherein the predetermined portion of the plurality of paths includes the plurality of paths corresponding to the plurality of traffic signals with a traffic queue delay time that is less than a predetermined traffic queue delay threshold.

13. The apparatus of claim 11, wherein the processor is further configured to execute instructions stored in the memory to:
  determine an intercept time period based on a velocity of the vehicle and the distance to a nearest one of the plurality of traffic signals on the optimized path, wherein the intercept time period is an amount of time for the vehicle to arrive at the nearest one of the plurality of traffic signals on the optimized path; and
  responsive to the red traffic signal time period beginning before the intercept time period elapses or the red traffic signal time period not elapsing before the intercept time period elapses, send a time modification message to a traffic signal control device associated with nearest one of the plurality of traffic signals on the optimized path, wherein the time modification message includes a request to increase the amount of time before the red traffic signal time period begins or a request to decrease the amount of time before the red traffic signal time period elapses.

14. The apparatus of claim 13, wherein the processor is further configured to execute instructions stored in the memory to:
  responsive to receiving a response to the time modification message including an amount of modification time, modify the plurality of travel times based on the amount of modification time indicated in the response to the time modification message, wherein the amount of modification time in the response to the time modification message indicates an increase in the amount of time before the red traffic signal time period begins or a decrease in the amount of time before the red traffic signal time period elapses.

15. The apparatus of claim 13, wherein the processor is further configured to execute instructions stored in the memory to:
  responsive to the red traffic signal time period beginning before the intercept time period elapses or the red traffic signal time period not elapsing before the intercept time period elapses, increase the velocity of the vehicle to arrive at the nearest one of the plurality of traffic signals on the optimized path before the intercept time period elapses, wherein the increase in the velocity of the vehicle is stopped when the velocity of the vehicle attains a predetermined maximum velocity.

16. A non-transitory computer-readable storage medium including program instructions executable by one or more processors that, when executed, cause the one or more processors to perform operations, the operations comprising:
  determining, based on route data, a plurality of distances corresponding to a plurality of paths for a vehicle between a vehicle location and a destination location, wherein the route data includes a map of a predetermined area including the vehicle location and the destination location;
  receiving traffic signal data from an external traffic signal data source via an electronic communication link, the traffic signal data including a plurality of traffic signal states for a plurality of traffic signals on the plurality of paths;
  determining a plurality of travel times corresponding to a predetermined portion of the plurality of paths based on the plurality of distances and the plurality of traffic signal states; and
  determining an optimized path between the vehicle location and the destination location based on the path of the plurality of paths that corresponds to a shortest travel time of the plurality of travel times.

17. The non-transitory computer-readable storage medium of claim 16, wherein the plurality of traffic signal states includes a red traffic signal state to indicate that a red traffic signal time period has not elapsed, wherein the red traffic signal state indicates that when the vehicle is within a predetermined distance of one of the plurality of traffic signals in the red traffic signal state, the vehicle is requested to stop until the red traffic signal time period elapses.

18. The non-transitory computer-readable storage medium of claim 17 further comprising:
  determine, for the plurality of paths, a plurality of traffic queue delay times based on a number of objects within a predetermined distance of the plurality of traffic signals or a velocity of the objects within the predetermined distance of the plurality of traffic signals, wherein the predetermined portion of the plurality of paths includes the plurality of paths corresponding to the plurality of traffic signals with a traffic queue delay time that is less than a predetermined traffic queue delay threshold.

19. The non-transitory computer-readable storage medium of claim 17 further comprising:
  determine an intercept time period based on a velocity of the vehicle and the distance to a nearest one of the plurality of traffic signals on the optimized path, wherein the intercept time period is an amount of time for the vehicle to arrive at the nearest one of the plurality of traffic signals on the optimized path; and
  responsive to the red traffic signal time period beginning before the intercept time period elapses or the red traffic signal time period not elapsing before the intercept time period elapses, send a time modification message to a traffic signal control device associated with nearest one of the plurality of traffic signals on the optimized path, wherein the time modification message includes a request to increase the amount of time before the red traffic signal time period begins or a request to decrease the amount of time before the red traffic signal time period elapses.

20. The non-transitory computer-readable storage medium of claim 19, further comprising:

responsive to receiving a response to the time modification message including an amount of modification time, modify the plurality of travel times based on the amount of modification time indicated in the response to the time modification message, wherein the amount of modification time in the response to the time modification message indicates an increase in the amount of time before the red traffic signal time period begins or a decrease in the amount of time before the red traffic signal time period elapses.

21. The method of claim 1, wherein the external traffic signal data source is a traffic management center.

* * * * *